United States Patent [19]

Teeters et al.

[11] Patent Number: 5,441,998
[45] Date of Patent: * Aug. 15, 1995

[54] REPULPABLE HOT MELT ADHESIVES

[75] Inventors: Susan M. Teeters, Sand Springs, Okla.; Charles H. Heroux, Scarborough, Canada; Michael D. Watson, Tulsa; William P. Cottom, Mounds, both of Okla.; Terrance D. Duryee, Charlotte, N.C.

[73] Assignee: Petrolite Corporation, St. Louis, Mo.

[ * ] Notice: The portion of the term of this patent subsequent to Feb. 21, 2012 has been disclaimed.

[21] Appl. No.: 18,087

[22] Filed: Feb. 16, 1993

[51] Int. Cl.$^6$ ............................................. C08K 5/01
[52] U.S. Cl. ........................ 524/270; 524/272; 524/274; 524/275; 524/277; 524/487; 524/489; 524/376; 524/378; 524/515
[58] Field of Search ............... 524/376, 378, 563, 515, 524/560, 270, 272, 274, 275, 277, 487, 489

[56] References Cited

U.S. PATENT DOCUMENTS

| | | | |
|---|---|---|---|
| 3,239,478 | 3/1966 | Harlan, Jr. | 260/27 |
| 3,390,035 | 6/1968 | Sands | 156/72 |
| 3,837,994 | 9/1974 | Flanagan et al. | 161/100 |
| 4,405,747 | 9/1983 | Ehmann et al. | 524/503 |
| 4,434,261 | 2/1984 | Brugel | 524/563 |
| 4,871,803 | 10/1989 | Zimmel et al. | 525/89 |
| 4,992,501 | 2/1991 | Hanninen et al. | 524/272 |

FOREIGN PATENT DOCUMENTS

PCT/US90/-
05599 10/1989 WIPO .
WO91/05107 10/1990 WIPO .

OTHER PUBLICATIONS

Bareco Division of Petrolite Corporation, "Microcrystalline Waxes in Protective Packaging", Release No. 305.0, (Feb. 1, 1976).

Doshi et al., "Additives to Combat Sticky Contaminants in Secondary Fibers", 1989 Contaminant Problems and Strategies in Wastepaper Recycling, TAPPI Seminar Notes, pp. 81–89.

Tom Garbutt et al., "A Technical Respective of the Effect of Hot Melt Adhesives on the Recycling of Post Consumer Recovered Paper/Paperboard Materials", pp. 159–164.

(List continued on next page.)

Primary Examiner—Jeffrey T. Smith
Attorney, Agent, or Firm—Pravel, Hewitt, Kimball & Krieger

[57] ABSTRACT

A composition is provided which, when added to an elastomer or tackifier, renders a repulpable hot melt adhesive. The compositions consists of an alkoxylated alcohol of the formula $$A\text{-}B \qquad (I)$$

wherein A is the unit $$CH_3(\overset{R}{\underset{|}{C}}H\overset{R_1}{\underset{|}{C}}H)_x- \qquad (IA)$$

and B is the unit $$CH_2O(CH_2\overset{R_2}{\underset{|}{C}}HO)_yH \qquad (IB)$$

and further wherein R and R$_1$ are independently selected from the group consisting of hydrogen and a C$_1$–C$_{10}$ alkyl group; R$_2$ is hydrogen or a C$_1$–C$_5$ alkyl group; x is between about 1 to about 142; and y is between about 2 to about 817, provided the weight ratio of B/A+B is between 51 and 90 percent. Such adhesive compositions may further contain wax or a primary linear polymeric alcohol. When combined with an elastomer and tackifier, such adhesives are repulpable and thus have particular applicability when used in combination with recyclable paper.

16 Claims, No Drawings

OTHER PUBLICATIONS

Graves et al., "A Study of the Effects of Wax Structure on the Performance Properties of EVA Based Hot Melt Adhesives", reprint of paper presented at 1987 ASC Raw Materials Seminar in Cincinnati, Ohio.

Lennert, "What's Up at P&G in Composting and Recycling", pp. 127–133.

McKinney, "A Review of Stickie Control Methods, Including the Role of Surface Phenomena in Control", 1989 Contaminant Problems and Strategies in Wastepaper Recycling, TAPPI Seminar Notes, pp. 101–107.

Unmuth et al., "Hot Melt Laminants, Background and intercomparison", a paper presented at the Technical Session of the Hot Melt Committee held at the 1972 Paper Synthetics Conference of TAPPI.

REPULPABLE HOT MELT ADHESIVES

BACKGROUND OF THE INVENTION

Solid waste management has long captured the public's attention. As landfills continue to close, new avenues must be opened for recycling municipal solid waste—paper and paperboard products, containers and other packaging.

Molten adhesive compositions, commonly referred to as hot melt adhesives, are normally used in the manufacture and packaging of paper products. Products which have been recycled from such paper products are often characterized by heavy spotting. Such spots are formed when the waste material is heated. As a result, the conversion of municipal solid waste materials containing hot melt adhesives to desirable recycled end-products has been relatively unsuccessful.

Hot melt adhesive particulates have been identified as the source of other problems encountered in mills; such as deposition on wire and press felts and doctor blades; breaks at the wet end or during re-reeling; and product quality deterioration due to sheet holes. Productivity and monetary losses have therefore been high.

The recycling of wastepaper from materials containing hot melt adhesives proceeds generally by one of three methods. In two of the methods, the hot melt adhesive is separated from a water slurry of the recycled fibers using either cleaners or screens. When screens are employed, the pulp slurry is passed through a cylindrical screen plate fitted with small holes or fine vertical slots. The particles of hot melt adhesives are separated out and rejected. When cleaners are used, the pulp slurry is pumped into the cleaner to form a spiraling flow. The slurry is thereby subjected to a centrifugal field. A central core is formed in which the particles of hot melt adhesives concentrate. A portion of the pulp slurry is extracted from this central core carrying the rejected hot melt adhesive particles.

In the third method, a thickened pulp slurry is heated to a temperature, generally ranging from 180° F. to 250° F. It is then subjected to an intensive shearing and/or kneading action. The hot melt particles are broken down to fine sizes, thereby minimizing spotting. Considerable energy is expended, however, in the process.

In the design of modern recycling systems, interest has been centered on those properties of hot melt adhesives which are useful in the separation of the adhesive particulates from the pulp slurry. Much attention has been paid to the size of the hot melt adhesive particulate and its resistance to breakup when the wastepaper is wetted and broken up in a pulper. Pulpers have been specifically designed to minimize breakup of the hot melt particulate during the pumping action. The larger particulates are separated from the pulp slurry with screens. To separate hot melt adhesive particles that pass through the screens, the pulp slurry is pumped into a through-flow cleaner wherein the smaller hot melt adhesive particulates are removed. If screening and cleaning are insufficient to produce the required cleanliness, the pulp is subjected to dispersion.

Molten adhesives must be repulpable in order to maximize wastepaper quality. Hot melt adhesives typically comprise an elastomeric resin and a tackifying resin. Antioxidants, fillers and plasticizers may further be incorporated. The elastomeric resin serves to form the backbone and contributes to the cohesive strength and toughness of the composition. Tackifying resins promote specific adhesion and help the adhesive to wet the substrate. In addition, a wax is frequently added to decrease melt viscosity, increase the crystallinity and control the open and set times of the elastomeric resin.

It is most desired to develop a hot melt adhesive which is compatible with aqueous systems and is recyclable. Compatibility is defined by the ability of the composition to impart adhesive properties to contiguous layers. Compatibility may be measured by various means such as viscosity stability, melt flow characteristics and cloud point. In particular, compatibility references the physical state wherein the elastomeric resin, tackifier and other additives are in a homogenous indistinct blend. In an incompatible adhesive, the elastomer, tackifier and other additives are in discrete areas in the molten state.

SUMMARY OF THE INVENTION

The present invention is drawn to a blend comprising an elastomeric resin and an alkoxylated alcohol of the formula $$A\text{-}B \qquad (I)$$

wherein A is the unit

$$CH_3(CHCH)_x- \qquad (IA)$$

with substituents $R$ and $R_1$ and B is the unit

$$CH_2O(CH_2CHO)_yH \qquad (IB)$$

with substituent $R_2$ and further wherein $R$ and $R_1$ are independently selected from the group consisting of hydrogen and a $C_1$–$C_{10}$ alkyl group; $R_2$ is hydrogen or a $C_1$–$C_5$ alkyl group; x is between about 1 to about 142; and y is between 2 to about 817. The weight ratio of $B/A+B$ in formula (I) is between about 51 and about 90 percent. The blend is extremely useful in hot melt adhesives by being combined with a tackifier. The invention is further drawn to hot melt adhesives containing such blends. A portion of the alkoxylated alcohol may be substituted with a wax and/or an oxygen-containing polymer provided the weight ratio of alkoxylated alcohol to wax and/or oxygen-containing polymer is greater than or equal to 1:1.

The presence of the high molecular weight alkoxylated alcohol in the blend increases the dispersability of the elastomeric resin and tackifier thereby making the resulting hot melt adhesive repulpable. The resulting adhesive compositions are dispersible in water and are, at the same time, repulpable. The elastomers and tackifying resins which may be employed are those known in the art.

DESCRIPTION OF THE PREFERRED EMBODIMENTS

A hot melt adhesive, repulpable in commercial milling operations, has been found to be compatible with alkoxylated high molecular weight alcohols. This invention pertains to the use of alkoxylated high molecular weight alcohols in hot melt adhesives. The alkoxylated alcohol may be packaged with the tackifier such that the end user would add the packaged material to an elastomeric resin in order to obtain the hot melt adhesive. Alternatively, the alkoxylated alcohol may be packaged with an elastomer such that the end user would add the packaged material to a tackifier. Still, the alkoxylated alcohol may be packaged by itself. The end user would therefore add the packaged alkoxylated alcohol to a tackifier and elastomeric resin. The invention further pertains to hot melt adhesive formulations containing elastomeric resin, tackifier and alkoxylated alcohol.

The use of the alkoxylated alcohol of this invention increases the dispersability of the elastomeric resin and tackifier, thereby making the hot melt adhesive repulpable.

Exemplary of the alkoxylated compounds used in formulating the hot melt adhesives of this invention are those represented by the formula:

A-B  (I)

wherein A is the unit

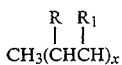  (IA)

and R and $R_1$ individually represent hydrogen or the same or different lower alkyl groups of from 1 to about 10 carbon atoms; and x represents a number of from about 1 to about 142 and preferably from about 11 to about 70; and further wherein B is the unit

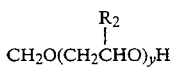  (IB)

and $R_2$ represents hydrogen or a $C_1$–$C_5$ alkyl group; y represents the average number of oxyalkylene groups present in the molecule and is a number of from about 2 to about 817, and preferably about 3 to about 408, most preferably from about 3 to about 204. In addition, the weight ratio of B/A+B in formula (I) is between about 51 to about 90 percent, preferably about 75 to about 85 percent, most preferably 80 percent. The average molecular weight of the alkoxylated alcohols may range from about 250 to about 5,000, preferably no greater than 1,000.

The Unit A precursor of the dispersant (of formula IA) normally has a molecular weight between about 250 to about 5,000, preferably 350 to about 2,000 more preferably 425 to about 1,000. In addition, the purity of the Unit A precursor is preferably greater than 70%.

Ethoxylated alcohols are preferred as the alkoxylated alcohols. Preferred alkoxylated alcohols for use in formulating the blends of this invention are those represented by formula (I) above wherein R and $R_1$ are independently selected from the group consisting of —H and $C_1$–$C_3$ alkyl and $R_2$ is —H or a $C_1$–$C_3$ alkyl group. Most preferred are those compounds wherein R, $R_1$ and $R_2$ are independently hydrogen or a methyl group, especially those represented by the formulae:

$$CH_3(CH_2CH_2)_xCH_2O(CH_2CH_2O)_yH$$  (IIA)

and

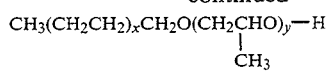  (IIB)

as well as mixtures thereof. As an alternative the compound may be of formula (I) above where $R_2$ is randomly selected from the substituents —H and —$CH_3$.

The average molecular weight of the alkoxylated alcohols of Formula (IIA) and (IIB) are most preferably about 700 to about 5,000.

Especially preferred alkoxylated alcohols include UNITHOX® 480 ethoxylate and UNITHOX® 580 ethoxylate. UNITHOX® 480 is an ethoxylated alcohol which consists of twenty weight percent of unit A of the formula IA (wherein R and $R_1$ are hydrogen) and having a molecular weight of about 425 and eighty weight percent of unit B of the formula IB. UNITHOX® 580 is an ethoxylated alcohol which consists of 20 weight percent of unit A of molecular weight 550 and 80 weight percent of the ethoxylate units of unit B. Both UNITHOX® 480 and UNITHOX® 580 are products of Petrolite Polymers Division in Tulsa, Okla. Approximately 15 to about 35 percent by weight of the hot melt adhesive of this invention is the alkoxylated alcohol. Preferably the alkoxylated alcohol of this invention contains 25 weight percent of the repulpable hot melt adhesive.

In another embodiment of this invention, a portion of the alkoxylated alcohol may be substituted in part with an oxygen-containing polymer. The addition of such oxygen-containing polymer increases the compatibility of the composition and further provides improved adhesive properties. The weight ratio of oxygen-containing polymer:alkoxylated alcohol should not exceed however 1:1. Preferably, the weight percent of alkoxylated alcohol to oxygen-containing polymer and/or wax is greater than or equal to 50%.

The oxygen-containing polymer may be a high molecular weight alcohol, a high molecular weight carboxylic acid or a cyclic anhydride graft polyolefin.

The molecular weight of the alkyl (C,H) portion of the oxygen-containing polymer is less than 2,000 preferably less than 1,500, most preferably less than 1,000.

The high molecular weight carboxylic acid is preferably a monocarboxylic acid of the formula RCOOH wherein R is a straight or linear saturated hydrocarbon chain of molecular weight less than 2,000. When the oxygen-containing polymer is a monocarboxylic acid, the molecular weight of R is most preferably between 300 and 800.

The high molecular weight oxygen-containing polymer can further be a hydrocarbon having multiple functional groups, such as carboxylic acid, carboxylic acid anhydrides, ketones, alcohols, esters, etc., distributed along their chains or are the result of a graft polymerization process. Particularly preferred are linear polyolefins, such as the polyethylenes, upon which has been grafted cyclic anhydrides such as maleic, fumaric and itaconic anhydride. Maleic acid anhydride is particularly preferred. The acid groups are grafted onto a polyolefin backbone which typically is polyethylene, polypropylene, and copolymers of ethylene and propylene. As set forth above, the molecular weight of the backbone is less than 2,000. The functional groups of the graft copolymers may be generally quantified by determination of an acid number which is the amount of potassium hydroxide in milligrams required to neutralize one gram of the polymer. Such graft copolymers further generally have an acid number in the range of about 5 to about 200.

Still preferred as the oxygen-containing polymer are those polymeric alcohols of the formula $$C-D \qquad (III)$$

wherein C is represented by a unit of the formula $$CH_3(\overset{R}{\underset{|}{C}}H\overset{R_1}{\underset{|}{C}}H)_g \qquad (IIIA)$$

and D is represented by a unit of the formula $$CH_2O(CH_2\overset{R_2}{\underset{|}{C}}HO)_hH \qquad (IIIB)$$

and further wherein R and $R_1$ are independently selected from the group consisting of hydrogen and a $C_1$-$C_{10}$ alkyl group; $R_2$ is hydrogen or a $C_1$-$C_5$ alkyl group; g is greater than or equal to 1 but less than 70, preferably from about 9 to about 60, most preferably from about 11 to about 45; and h is between about 0 to about 45, preferably 3 to 40, most preferably 14 to 25; provided the weight percent of D/C+D is between 0 and 50 percent. The weight percent of D/C+D is preferably between 0 and 20 percent. The molecular weight of the C units, as set forth above, is less than 2,000, preferably less than 1500, most preferably less than 1,000.

Exemplary of suitable polymeric alcohols for use in the several embodiments of this invention (wherein h is zero) are those of the formula $$CH_3(\overset{R}{\underset{|}{C}}H\overset{R_1}{\underset{|}{C}}H)_gCH_2OH \qquad (IV)$$

wherein R and $R_1$ individually represent hydrogen or the same or different lower alkyl groups of from 1 to about 10 carbon atoms; and g is greater than or equal to 1 but less than 70, and preferably from about 9 to about 60. Such alcohols are commercially available under the trade name UNILIN ® alcohols from Petrolite Polymers Division of Petrolite Corporation, Tulsa, Okla. Examples of such long chain primary alcohols are UNILIN ®-425, UNILIN ®-550 and UNILIN ® 350 which have a molecular weight of about 425, 550, and 350, respectively.

Further preferred is an adhesive system containing an alcohol (h of formula IIIB is greater than or equal to 1) wherein the C unit has a molecular weight between about 350 to about 1,000. Especially preferred alcohols include UNITHOX ® 420 and UNITHOX ® 520. UNITHOX ® 420 and 520 are ethoxylated alcohols which consist of 80 weight percent of units of the formula IIIA:

$$CH_3(\overset{R}{\underset{|}{C}}H\overset{R_1}{\underset{|}{C}}H)_g \qquad (IIIA)$$

and 20 weight percent of ethoxylate units of the formula:

$$CH_2O(\overset{R}{\underset{|}{C}}H\overset{R_2}{\underset{|}{C}}HO)_h \qquad (IIIB)$$

wherein R, $R_1$ and $R_2$ are all hydrogen. The molecular weight of the units of formula IIIA of UNITHOX ® 420 and UNITHOX ® 520 is about 425 and 550, respectively. Such products are commercially available from Petrolite Polymers Division in Tulsa, Okla.

Especially preferred alcohols for use in formulating hot melt adhesives of this invention are those represented by formula (III) above wherein R and $R_1$ are independently selected from the group consisting of —H and $C_1$-$C_{10}$ alkyl and $R_2$ is —H or a $C_1$-$C_5$ alkyl group. Most preferred are those compounds represented by the formula:

$$CH_3(CH_2CH_2)_gCH_2O(CH_2CH_2O)_hH \qquad (IVA)$$

and $$CH_3(CH_2CH_2)_gCH_2O(CH_2\overset{}{\underset{|}{C}}HO)_h-H \atop CH_3 \qquad (IVB)$$

as well as mixtures thereof. As an alternative the compound may be of formula (III) above where $R_2$ is randomly selected from the substituents —H and —$CH_3$.

The most preferred alcohols for use in this invention typically average 24 to 45 carbon atoms (on a weight basis), preferably 28 to 42 carbon atoms, most preferably about 30 to 40 carbon atoms. Such alcohols are derived by hydroxylating long chain hydrocarbons.

Best results are generally obtained when the value of g in formula (IIIA) is equivalent to the value of x of the A unit of formula (IA) above.

The alkoxylated alcohols of formula (I) and the alcohols of formula (III) of the present invention are prepared by reacting the corresponding primary linear polymeric alcohol with an oxyalkylating agent. Suitable oxyalkylating agents include ethylene oxide, propylene oxide and mixtures thereof. The starting materials can be readily alkoxylated with the oxyalkylating agent using typical base catalysts, such as potassium hydroxide, sodium hydroxide, sodium ethoxide, potassium t-butoxide, sodium hydride or sodium or potassium metals. The reaction is normally conducted under pressures of 0 to 60 psig and at temperatures of 212° to 356° F. (100° to 180° C.). Higher temperatures are normally avoided to minimize side reactions and color formation. By varying the molecular weight of the starting alcohol and the amount of alkoxylation, a variety of compounds of varying molecular weights can be prepared.

In addition, the composition of this invention may contain a hydrocarbon wax, including oxidized hydrocarbons. These waxes can be a hydrocarbon having multiple functional groups, such as carboxylic acid, carboxylic acid anhydrides, ketones, alcohols, esters, etc., distributed along their chains or are the result of a graft polymerization process. Particularly preferred are linear polyolefins, such as the polyethylenes, upon which has been grafted cyclic anhydrides such as maleic, fumaric and itaconic acid anhydride. Maleic acid anhydride is particularly preferred. The acid groups are grafted onto a polyolefin backbone which typically is polyethylene, polypropylene, and copolymers of ethylene and propylene. The functional groups of the graft copolymers may be generally quantified by determination of an acid number which is the amount of potassium hydroxide in milligrams required to neutralize one gram of the polymer. Such graft copolymers further generally have an acid number in the range of from about 5 to about 200.

Further, the wax may be a linear saturated aliphatic hydrocarbon of molecular weight, preferably a hydrocarbon having a molecular weight between about 300 to about 5,000. Such waxes include natural waxes as well as synthetic waxes like such polyolefin waxes as polyethylene wax. The natural waxes include such petroleum-derived waxes like paraffin and microcrystalline waxes. The paraffin waxes are mostly linear alkanes having about 20–36 carbon atoms per molecule on the average and a molecular weight of about 280–500 and may include $C_{18}$–$C_{36}$ isoalkanes and cycloalkanes. The microcrystalline waxes have molecular weights of about 500–700 with somewhat more branching than the paraffin waxes.

Furthermore, the wax used in present invention may include Fischer-Tropsch waxes. Such waxes are polymethylenes. Polymethylene wax production is based on the Fischer-Tropsch synthesis, which is basically the polymerization of carbon monoxide under high pressure to produce the wax. The polymethylene waxes useful herein preferably may have an average molecular weight of 600–1,000.

Other closely related materials that can be used include such natural waxes as beeswax, carnauba and candelila waxes. In addition, the composition of this invention may contain a mixture of any of the waxes set forth above.

Also contemplated within the waxes of the present invention is one which has been chemically modified. These include the partially oxidized polyethylenes, polymethylenes and the petroleum-derived waxes. The oxidized low molecular weight mostly linear hydrocarbons of a molecular weight of 300–3,000 have multiple functional groups, such as carboxylic acid, ketones, alcohols, esters, etc., distributed along their chains or are the result of a graft polymerization process. Particularly preferred are linear polyethylenes upon which has been grafted cyclic anhydrides such as maleic, fumaric and itaconic acid anhydride. The functional groups of the oxidized hydrocarbons may be generally quantified by determination of an acid number which is the amount of potassium hydroxide in milligrams required to neutralize one gram of the oxidized polymer. The oxidized hydrocarbons will normally have an acid number in the range of from about 5 to about 200.

The tackifying resin serves to extend the adhesive properties of the elastomeric polymer present in the hot melt adhesive. Such tackifying resins include (1) natural and modified rosins, such as gum rosin, wood rosin, tall oil rosin, distilled rosin, hydrogenated rosin, dimerized rosin and polymerized rosin; (2) glycerol and pentaerythritol esters of natural and modified rosin such as, for example, the glycerol ester of pale, wood rosin, the glycerol ester of hydrogenated rosin, the glycerol ester of polymerized rosin, the pentaerythritol ester of hydrogenated rosin and the phenolic-modified pentaerythritol ester of rosin; (3) polyterpene resins especially those resulting from the polymerization of terpene hydrocarbons, such as the bicyclic mono-terpene known as pinene, in the presence of Friedel-Crafts catalysts; (4) chlorinated terphenyl resins containing from about 42 to 60%, by weight, of chlorine; (5) phenolic-modified terpene resins such as, for example, the resin product resulting from the condensation in an acidic medium of a bicyclic terpene and a phenol; and (6) aliphatic petroleum hydrocarbon resins principally those resulting from the polymerization of monomers consisting primarily of olefins and diolefins. Excellent results have been obtained with polymerized rosin pale, wood rosin, the glycerol ester of hydrogenated rosin, the glycerol ester of polymerized rosin, the pentaerythritol ester of hydrogenated rosin, and phenolic-modified pentaerythritol ester of rosin which has been hydrogenated. Terpene and coumarone-indene resins are also employed. Polyterpene-resins (obtained by distillation of conifers), phenolic resins, and petroleum hydrocarbon resins, maleic anhydride-modified rosin and rosin derivatives, partial esters of styrene-maleic acid copolymers, chlorinated biphenyls and oil-soluble phenol-aldehyde resins can also be used.

Effective proportion of tackifier for use in the present invention is about 30 to about 70 weight, preferably 40 to 60, most preferably 45 to 50, percent of the adhesive composition.

The elastomeric resins used in the hot melt adhesives of this invention may be selected from conventional ethylene vinyl acetate copolymers having approximately 25 to 28 weight percent vinyl acetate units, ethylene acrylic acid copolymers, natural or synthetic rubbers including styrene-isoprene and styrene-butadiene random and block copolymers, polyvinyl acetate and vinyl acetate/unsaturated carboxylic acid copolymers, polyethylene, polypropylene, polyvinyl acetals, polyamides, polyesters, polyurethanes and ethyl cellulose.

Of these, ethylene/vinyl acetate copolymers are most preferred and are used primarily because of their excellent heat stability and high resistance to aging, chemical attack and water.

In addition, block copolymers may be used as the resin in this invention. Such block copolymers are of the A-B-A type wherein A is a thermoplastic polymer block and B is the elastomeric polymer block of a conjugated diene. The average molecular weight of the A and B blocks are 5,000 to 125,000 and 15,000 to 250,000, respectively. The block copolymers may be partially or completely hydrogenated. The end blocks may comprise homopolymers or copolymers of vinyl monomers such as vinyl arenes, vinyl pyridines, vinyl halides and vinyl carboxylates, as well as acrylic monomers such as acrylonitrile, methacrylonitrile esters of acrylic acids etc. Monovinyl aromatic hydrocarbons include particularly those of the benzene series such as styrene, vinyl toluene, vinyl xylene, ethyl vinyl benzene as well as dicyclic monovinyl compounds such as vinyl naphthalene. Other non-elastomeric terminal polymer blocks may be derived from alpha olefins, alkylene oxides, acetals, urethanes, etc. The center elastomeric blocks are prepared from conjugated dienes such as isoprene, butadiene, copolymers of styrene and butadiene as well as their homologues.

About 15 to about 35, most preferably 25, parts by weight of the hot melt adhesive composition of this invention is the elastomeric resin. Most preferably the weight ratio of elastomeric resin to alkoxylated alcohol in the hot melt adhesive formulation is approximately 1:1.

In accordance with the present invention, a composition is provided to render hot melt adhesives which are dispersible in water while at the same time being repulpable. The hot melt adhesives containing the alkoxylated alcohols of this invention usually have a softening point within the range of 60°-120° C. The present invention therefore is an improvement over modern recycling methods by making repulpable paper products containing such adhesive systems.

Antioxidants, fillers and plasticizers may further be incorporated in the adhesive system of this invention.

A stabilizer can further be added to the adhesive system of the invention. Such stabilizers serve to enhance the pot-life of the molten adhesive. Typically useful stabilizers or antioxidants for the adhesive composition are the 2,4,6-trialkylated monohydroxy phenols, e.g., 2,4,6-tri-tertiarybutyl phenol and 2,6-di-tertiary-butyl-4-methyl phenol, 4,4'-thio-bis (6-tertiary butyl m-cresol); butylated hydroxy anisole and butylated hydroxy toluene. Effective proportions of stabilizer ordinarily are in the range of from about 25 parts per million to about 0.5 part per 100 parts by weight of the adhesive composition, preferably about 0.1 to 0.4 part per 100.

The compositions of this invention are extremely useful as repulpable adhesives for those cellulose containing products consisting of light to heavy paper products including tissue, newsprint, Kraft paper, cardboard stock and the like. The paper can be light weight, such as facial tissue, to heavy fiber stock such as corrugated cardboard manufacture. The paper face stock may be formed of any pulpable cellulosic fiber material, virgin and recycled.

As set forth above, the alkoxylated alcohol may be packaged separately or admixed with tackifier and/or elastomeric resin. The alkoxylated alcohols are added to the elastomeric and/or tackifier at a temperature between about 140° C. to 220° C.

The hot melt adhesives of this invention may be produced by a variety of methods. For instance, the elastomer and tackifier could be molten. To the molten mass, the alkoxylated alcohol may then be added. If a wax or primary linear polymeric alcohol are used as partial substitutes for the alkoxylated alcohol, they may be added at this juncture with the alkoxylated alcohol.

The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims which follow.

EXAMPLES 1-8

The examples illustrate the preparation of a number of hot melt adhesives of this invention.

A heavy duty mixer equipped with a stirring paddle was used with a suitable container which had been heated to 320° F. and charged with 45 parts rosin dimer tackifier, commercially available as ZONATAC 105L from Arizona Chemical Company. This tackifying resin was completely melted. Stirring was then initiated whereupon 30 parts of an ethylene-vinyl acetate polymer containing approximately 28 weight percent of vinyl acetate units (commercially sold under the name ELVAX 240) was added slowly in order to prevent the formation of lumps. Heating and stirring were continued until a homogeneous mass was obtained whereupon 25 parts of Substance X was added to reduce the melt viscosity of the system. The results are set forth in Table I. (In the Table, PE=Polyethylene; MC=Microcrystalline wax; VL—Very Large; NB=No Breakdown; MD=Much Debris; SP=Small Pieces)

TABLE I

| 45% TACKIFIER, 30% EVA, 25% SUBSTANCE X | | |
|---|---|---|
| EX No. | Substance X | Observations |
| 1 | paraffin, mp = 147° C. | VL/NB |
| 2 | PE, mp = 175° C. | VL/NB |
| 3 | PE, mp = 211° C. | VL/NB |
| 4 | MC, mp = 175° C. | VL/NB |
| 5 | UNITHOX ® 480 | SP/MD |
| 6 | UNITHOX ® 580 | SP/MD |
| 7 | UNITHOX ® 780[1] | Fewer SP/MD |
| 8 | UNITHOX ® 490[2] | Larger pieces/MD |

[1]UNITHOX ® 780 ethoxylate is an ethoxylated alcohol which consists of 20 wt. % of the units represented by IA of molecular weight 700 and 80 wt. % of the ethoxylate unit of formula IB.
[2]UNITHOX ® 490 ethoxylate is an ethoxylated alcohol which consists of 10 wt. % of the units represented by formula IA of molecular weight 425 and 90 wt. % of the units represented by formula IB.

What is claimed is:

1. A composition, which when added to a tackifier renders a repulpable hot melt adhesive, comprising:
   (a) an elastomeric resin; and
   (b) an alkoxylated alcohol of the formula

A-B      (I)

wherein A is the unit

      (IA)

and B is the unit

      (IB)

and further wherein R and $R_1$ are independently selected from the group consisting of hydrogen and a $C_1$-$C_{10}$ alkyl group; $R_2$ is hydrogen or a $C_1$-$C_5$ alkyl group; x is between about 1 to about 142; and y is between about 2 to about 817, provided the weight ratio of B/A+B is between 51 and 90 percent.

2. The composition of claim 1 wherein x is between about 11 to about 70.

3. The composition of claim 1 wherein y is between about 3 to about 408.

4. The composition of claim 2 wherein y is between about 3 to about 204.

5. The composition of claim 1 wherein the elastomer is selected from the group consisting of copolymers of vinyl acetal and an ethylenically unsaturated carboxylic acid or ester, ethylene acrylic acid copolymer, ethylene vinyl acetate copolymer, polyvinyl acetal, polyethylene, polypropylene, polyamide, polyester condensation product, polyurethane, an alkyl cellulose and an ABA block copolymer wherein the A block is a thermoplastic polymer and the B block is a conjugated diene.

6. The composition of claim 5 wherein the elastomer is an ethylene vinyl acetate copolymer.

7. The composition of claim 1 wherein x is between about 11 to about 24 and y is between about 2 to about 65.

8. The composition of claim 1 wherein the weight ratio of B/A+B is between 75 to about 85%.

9. The composition of claim 7 wherein R, $R_1$, and $R_2$ are independently hydrogen or a methyl group.

10. The composition of claim 1 wherein the elastomer is selected from the group consisting of natural rubber and synthetic rubber.

11. The composition of claim 1 wherein the elastomer is polyvinyl acetate.

12. The composition of claim 6 wherein the copolymer contains between 25 to 28 weight percent vinyl acetate units.

13. The composition of claim 8 wherein the weight ratio B/A+B is 80%.

14. The composition of claim 1 wherein R, $R_1$ and $R_2$ are independently selected from the group consisting of hydrogen and a $C_1$–$C_3$ alkyl group.

15. The composition of claim 14 wherein the alkoxylated alcohol is of the formula $$CH_3(CH_2CH_2)_xCH_2O(CH_2CH_2O)_yH.$$

16. The composition of claim 14 wherein the alkoxylated alcohol is of the formula $$CH_3(CH_2CH_2)_xCH_2O(CH_2CHO)_y-H.$$
$$\phantom{CH_3(CH_2CH_2)_xCH_2O(CH_2CH}|$$
$$\phantom{CH_3(CH_2CH_2)_xCH_2O(CH_2CH}CH_3$$

* * * * *